Patented Sept. 19, 1939

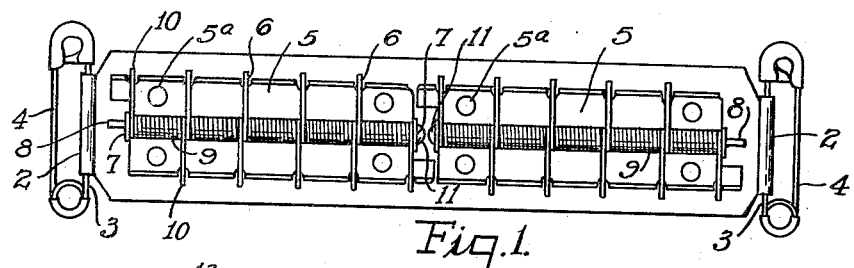
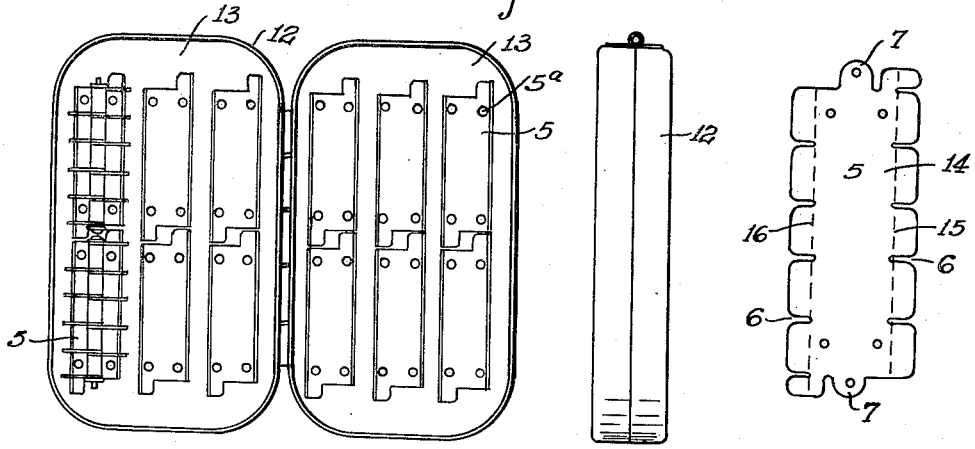
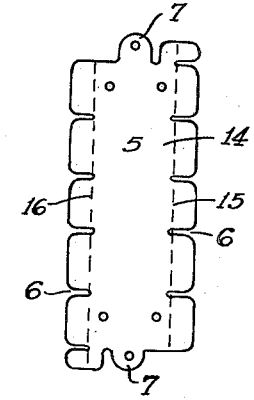
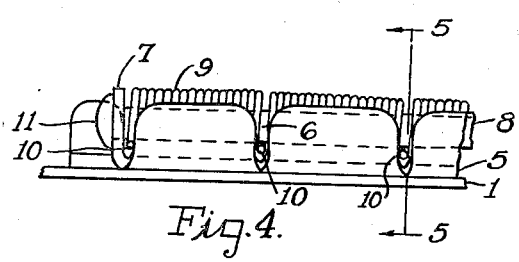
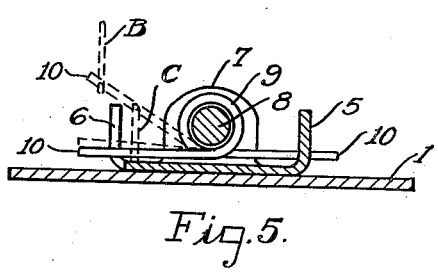
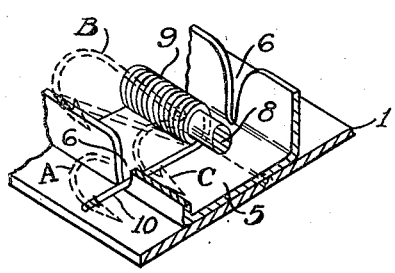

2,173,363

UNITED STATES PATENT OFFICE 2,173,363

MEANS FOR CARRYING FISH LURES, TROUT FLIES, AND THE LIKE

Max L. Hillmer, Huntington, Ind.

Application February 23, 1938, Serial No. 192,107

6 Claims. (Cl. 43—32)

This invention relates to new and useful improvements in means for carrying fish lures, trout flies and the like.

It is one of the principal objects of my invention to offer in a trout or fish lure holder the convenience or safety that is not now provided by known devices. For example, flies are frequently carried by hooking them through the wearer's hat band or into fabric, sheep's wool or through the closely wound coils of a spring. If the flies are hooked securely by any of these methods, it is difficult and sometimes inconvenient to remove them. Unless the flies are securely attached, there is also danger of their coming off and being lost.

My invention, on the other hand, provides means whereby each fly can be easily and securely held with very little danger of its becoming loose and flying off either by the action of the wind or by coming in contact with something else. Furthermore, the flies can be removed easily one at a time without disturbing the others.

The holder can be readily attached to a suitable base that can be bent to conform to the wearer's hat or it can be secured to any convenient place on the wearer's apparel such as a coat sleeve or the front of his jacket. The holders can also be mounted in a box or container which in turn can be fastened to a creel or other convenient object, or carried in the pocket. When mounted in a creel, a large quantity of flies is easily accessible, so that they can be removed with one hand without any danger of loss by spilling or by the action of the wind.

Other important and incidental objects will be brought out in the following specification and particularly pointed out in the subjoined claims.

In the accompanying drawing, Figure 1 shows my invention in one form for attachment to wearing apparel. Figure 2 illustrates my invention in another form wherein the flyholders are attached to the opposing inner faces of a case. Figure 3 shows the flyholder case in its closed position. Figure 4 is a detail view of my flyholder. Figure 5 is a cross-sectional view of my flyholder taken on the line 5—5 of Figure 4. Figure 6 is a perspective view of a portion of my flyholder showing, in dotted line, the fly being inserted in it. And Figure 7 is a view of a blank from which a holder plate is formed.

Referring to the accompanying drawing for a detailed description of one form of embodiment of my invention, the numeral 1 designates an elongated back plate having its opposite ends 2—2 reduced in width. The reduced ends 2—2 are formed to encircle the backs 3 of conventional safety pins 4. By this method, the plate may be attached to the clothing of the wearer in an accessible position (see Figure 1).

Secured to the face of the plate 1 between the ends 2—2, and positioned axially thereof, are holder plates 5—5 secured by rivets 5ª to the former (see Figure 1).

Each of the holder plates 5 is formed along its sides with a series of spaced recesses 6 which, when the plate is formed to a channel shape, provide a series of spacers oppositely disposed. At each end, the plates 5 are formed with narrow lugs 7 projected upwardly from the face of the plate. These lugs 7 are apertured to receive therein a pin 8 extending axially of the plates 5 from the lugs 7 at each end thereof.

Positioned upon the pins 8, between the lugs 7—7 are a series of helical springs 9, one for each pair of recesses 6. These springs 9 are provided with free ends 10—10 oppositely disposed and, through the helical tension of the spring, are held firmly against the holder plates 5 spaced by the recesses 6. (See Figure 1.)

When my flyholder is assembled, the pins 8—8 for the respective holders 5—5 are inserted oppositely with their heads 11 adjacent as shown in Figure 1 and, when attached to the holder by the rivets 5ª, their alined position prevents loss of these pins.

The outer free ends 10—10 of the springs 9 extend beyond the recesses 6 in which they are held, a narrow space being provided between them and the holder back plate 1 as shown in Figure 5.

Now, when it is desired to attach a fly to the holder, the barbed end of the hook, as shown in dotted line at "A" in Figure 6, is placed under the projecting free end 10 of one of the springs 9. With the hook grasped between the fingers, the free end of the spring is lifted to the position "B" in Figures 5 and 6, and the fly moved inwardly toward the coiled spring 9.

When the hook is released, the free end 10 of the spring will return to its normal position and the hook will be firmly held between it and the holder plate 5 in the position shown at "C" in Figures 5 and 6. The channel sides between the recesses are of such a height that they serve to prevent the fly from sliding through them and off the spring.

To remove a fly from the holder, it is only necessary to lift the selected fly until the free end of the spring 9 holding it is elevated above the adjacent recess 6. The fly is then removed from the spring, the placing and removal of the fly requiring the use of but one hand.

In my flyholder case 12, the holders 5 are attached to the case covers 13 by rivets 5ª and, as shown, when the case is opened, all of the flies therein are immediately available for a quick selection without loss of time or entangled flies. In other respects, my flyholder case is similar to the holder shown in Figure 1.

In Figure 7 I have shown a blank from which a holder plate 5 is formed. The blank 14 is adapted to be formed along the fold lines 15 and 16 to provide a channel structure, wherein the free ends 10—10 of the springs 9 are received by the narrow slots 6. It is thus seen that the free ends of the spring are secured against endwise movement when engaging or disengaging a fly from my holder.

While I have shown my invention in two forms, I do not wish to be limited to the specific mounting arrangements herein disclosed, it being obvious that such a flyholder could be attached to a creel, an arm band or varied attachment means may be used.

I do not wish to be limited to other details of construction and arrangement herein shown and described, and any changes or alterations may be made therein within the scope of the subjoined claims.

Having described my invention, I claim:

1. A holder for fish lures, trout flies and the like, comprising a base piece, helically wound springs secured longitudinally to the middle portion of said piece and having free ends extending laterally of said piece, and spaced means at the sides of the base piece between which the free ends of the springs pass to receive the hook ends of said lures and the like to confine them between the spaced means and the wound portions of the helical springs.

2. A holder for fish lures, trout flies and the like, comprising a formed plate, helically wound springs secured longitudinally to the middle portion of said plate and having free ends extending laterally of said plate, and ears turned up at the sides of said plate and spaced a sufficient distance apart at their longitudinal edges to permit the free ends of the springs to project outwardly between them to receive the hook ends of said lures and the like for the purpose specified.

3. A holder for fish lures, trout flies and the like, comprising a series of formed plates secured together in longitudinal alinement, helically wound springs secured longitudinally to the middle portion of each plate and having free ends extending laterally of said plate, said plates having turnel up side portions spaced from each other, the free ends of said springs projecting laterally between the said side portions for the purpose specified.

4. A holder for fish lures, trout flies and the like, comprising a plate, a shaft mounted longitudinally and centrally of said plate, a multiplicity of coiled springs supported on said shaft, the free ends of said springs lying flat against one surface of said plate, and spaced members at the sides of said plate providing narrow openings through which the free ends of said springs pass to receive and be lifted up out of said openings by the hook ends of said lures and the like to permit them to be moved along said ends to positions for secure confinement between the spaced members and the wound portions of said springs.

5. A holder for fish lures, trout flies and the like, comprising a base piece, helically wound springs secured longitudinally to the middle portion of said piece, spaced means at the sides of the base piece between which the free ends of the springs pass for the purpose specified, and fastening means carried by said base piece for attaching the latter to the wearer's apparel.

6. A holder for fish lures, trout flies and the like, comprising a base piece, helically wound springs secured longitudinally to the middle portion of said piece, spaced means at the sides of the base piece through which the free ends of the springs pass to receive said lures and the like, a container, and means for confining said holders within the container.

MAX L. HILLMER.